UNITED STATES PATENT OFFICE.

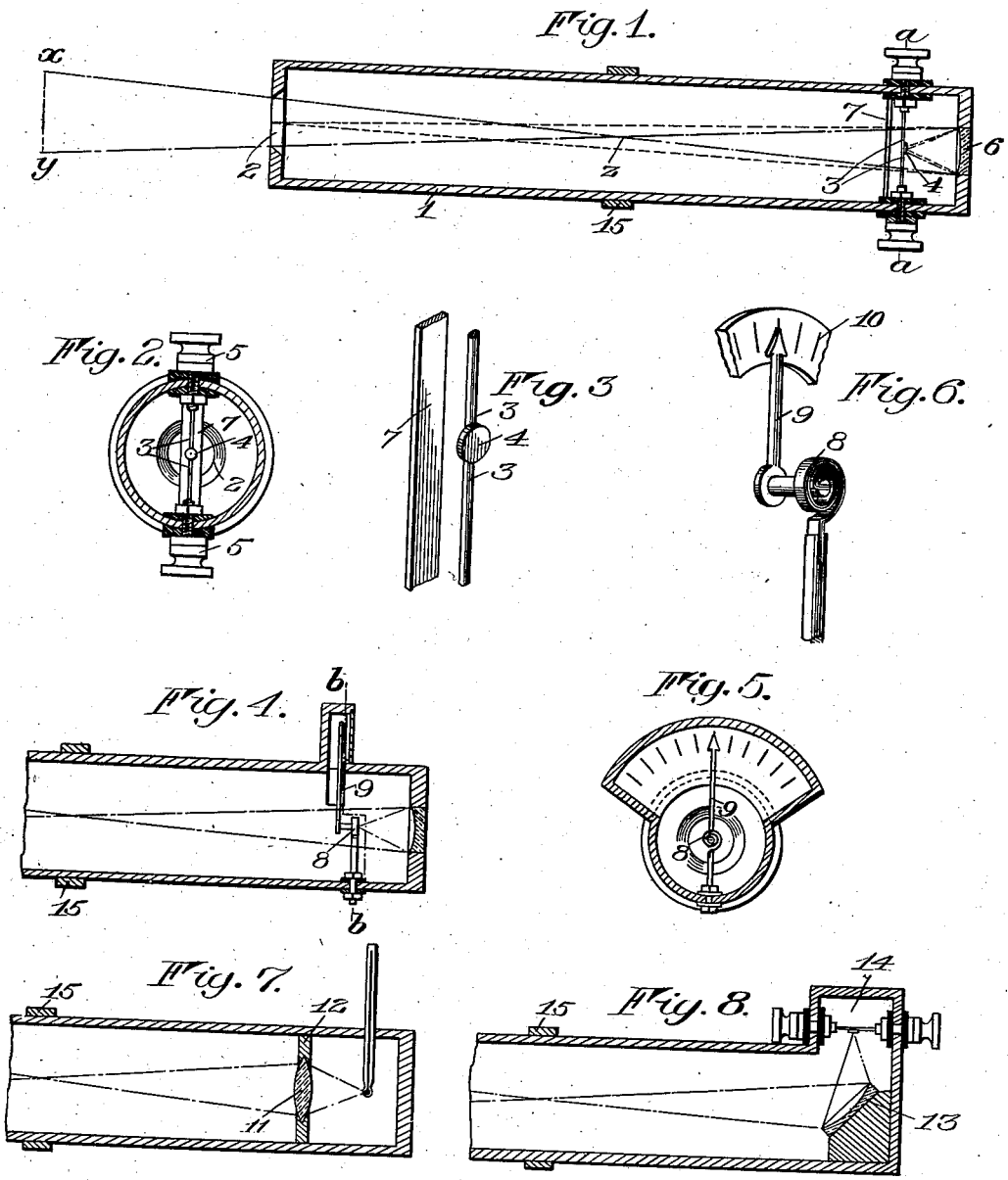

CHARLES EDWIN FOSTER, OF ROCHESTER, NEW YORK.

PYROMETER.

933,543.

Specification of Letters Patent.  Patented Sept. 7, 1909.

Application filed February 10, 1909. Serial No. 477,151.

*To all whom it may concern:*

Be it known that I, CHARLES EDWIN FOSTER, of Rochester, in the county of Monroe and State of New York, have invented certain new and useful Improvements in Pyrometers; and I do hereby declare the following to be a clear, full, and exact description of the same, reference being had to the accompanying drawings, forming a part of this specification, and to the reference-numerals marked thereon.

The present invention relates to pyrometers and more particularly to that type in which the radiant heat of a body is measured without subjecting the pyrometer structure to the actual temperature to be measured, an object of the invention being to dispense with focusing operations or adjustments and yet obtain a definite focus so that an accurate measurement may be obtained in a minimum space of time.

To this and other ends the invention consists in certain improvements and combinations of parts all as will be hereinafter more fully described, the novel features being pointed out in the claims at the end of the specification.

In the drawings: Figure 1 is a longitudinal sectional view of one embodiment of the invention in which a concave mirror is employed for projecting the rays on a thermo-electric couple; Fig. 2 is a section on line *a—a*, Fig. 1; Fig. 3 is a detail perspective view of the thermo-couple and the guard therefor illustrated in Figs. 1 and 2; Fig. 4 is a longitudinal sectional view of another embodiment of the invention; Fig. 5 is a section on line *b—b*, Fig. 4; Fig. 6 is a detail perspective view of the sensitive device illustrated in Figs. 4 and 5; Fig. 7 is a longitudinal section of another embodiment of the invention in which the sensitive device is in the form of a mercury or spirit thermometer; and Fig. 8 is a longitudinal section of an embodiment in which the sensitive device is offset in order not to be affected by direct rays from the hot body.

The present invention is based upon the principle of the concentration of radiant heat upon a receiving surface which in turn concentrates it onto another surface of relatively smaller area, giving greater intensity and therefore causing a larger rise in temperature of the small area which is subject to easier measurement, the amount of rays received from the hot body being limited so that the indications are independent of the distance between the hot body and the receiving surface.

A feature of this invention is the provision of a constant and definite focus so that the usual focusing device or eyepiece together with the focusing operations may be dispensed with. This feature may be embodied in various constructions, some of which are herein illustrated, that shown in Figs. 1 to 3 employing a casing 1 preferably of tubular form having an opening or aperture 2 located in this instance at one end thereof. Carried by and arranged within the said casing is the sensitive device consisting of a thermo-electric couple 3 having at its junction a small heat receiving surface or plate 4. The outer ends of the thermo-electric couple may be secured to binding posts 5 which in turn may be connected to a measuring device such as a potentiometer or a sensitive milli voltmeter, it of course being understood that the concentration of heat on the plate 4 will generate an E. M. F. from the measurement of which the temperature of the hot body may be computed.

In order to concentrate the heat on the sensitive device, there is in this instance employed an optical condenser in the form of a concave mirror 6 located at that end of the casing opposite the aperture and having one of its conjugate foci at the aperture and the other at the sensitive device. A guard or shield 7 may be arranged in front of the thermo-electric couple so that the latter is subjected only to the radiation focused by the mirror 6 and is protected against direct rays from the hot body.

In the embodiment of the invention shown in Figs. 4, 5 and 6, the parts are the same as shown in Figs. 1 to 3, except that the sensitive device is made up of two or more metals 8 fastened together and rolled into volute form in such a manner that the increase of temperature will cause the curling up or uncurling of the spiral, due to the different thermo-coefficients of expansion. A pointer or index 9 projects through the casing and travels over a scale 10 to indicate the temperature.

In Fig. 7 the condenser or concentrator is in the form of a convex lens 11 arranged in a partition 12 between the aperture and the sensitive device which is in the form of a spirit or mercury thermometer having the usual indications thereon.

In Fig. 8 a concave mirror 13 is arranged at an angle to the plane of the aperture and at the rear end of the casing so as to focus on a sensitive device located in a laterally offset pocket 14 in the casing, the pocket being provided to protect from direct radiation the sensitive device, which may be of the form shown in Figs. 1 to 3.

In using the present invention its aperture is directed toward the hot body represented by the line $x$—$y$, Fig. 1, the only condition being that the aperture be completely filled by the hot body as viewed from all points on the condenser, and to this end the diameter of the hot body $x$—$y$ must equal the base of the triangle $x, y, z$ or any extension thereof. The triangle is determined by two intersecting lines drawn from two diametrically opposite points at the perimeter of the condenser and coinciding with two diametrically opposite points at the perimeter of the aperture. At the point of intersection $Z$ or the apex of the angle $x, y, z$, a distinguishing device such as a collar may be located on the exterior of the casing so that a user may determine whether the instrument is located within the limits between which it must be positioned. The condition of the sensitive device is, of course, found from the indicator which gives either a direct reading of the temperature, as shown in Figs. 4 to 7, or a reading from which the temperature may be computed as shown in Figs. 1 to 3 and 8.

From the foregoing it will be seen that there has been provided a pyrometer which need not be subjected to the temperature of the hot body and which has a constant and definite focus so that focusing devices or eyepieces are unnecessary, thus permitting the user to obtain an accurate measurement of the temperature of a hot body in a minimum space of time.

I claim as my invention:

1. In a pyrometer, the combination with a casing having an aperture therein, of a heat sensitive device carried with the casing in fixed relation to the aperture, and an optical condensing device fixed relatively to the aperture and to the sensitive device, and having one of a pair of its conjugate foci at the aperture and the other at the sensitive device.

2. In a pyrometer, the combination with a casing having an aperture therein, of a heat sensitive device in fixed relation to the apertures, an optical condenser fixed relatively to the aperture and to the sensitive device and having one of a pair of its conjugate foci at the aperture and the other at the sensitive device, and means for determining the amount that the sensitive device is affected by the rays concentrated thereon by the condenser.

3. In a pyrometer, the combination with a casing having an aperture therein, of a heat sensitive device carried by the casing in fixed relation to the aperture and protected from direct rays from the hot body through the aperture, and an optical condenser fixed relatively to the aperture and to the heat sensitive device and having one of a pair of its conjugate foci at the aperture and the other at the sensitive device.

4. In a pyrometer, the combination with a casing having an aperture therein, of a heat sensitive device carried by the casing in fixed relation to the aperture, an optical condenser fixed relatively to the aperture and to the heat sensitive device, and having one of a pair of its conjugate foci at the aperture and the other at the sensitive device, and a distinguishing device on the casing located in a plane transverse of the casing with the point of intersection of two lines drawn from diametrically opposite points at the perimeter of the condenser and coinciding with two diametrically opposite points at the perimeter of the aperture.

CHARLES EDWIN FOSTER.

Witnesses:
RUSSELL B. GRIFFITH,
HAROLD H. SIMMS.